United States Patent [19]

Dziki

[11] Patent Number: 4,552,287

[45] Date of Patent: Nov. 12, 1985

[54] THERMOPLASTIC DISPENSING DEVICE

[75] Inventor: Michael M. Dziki, St. Paul, Minn.

[73] Assignee: Minnesota Mining and Manufacturing Company, Saint Paul, Minn.

[21] Appl. No.: 456,346

[22] Filed: Jan. 7, 1983

[51] Int. Cl.<sup>4</sup> ............................................. B67D 5/32
[52] U.S. Cl. ................................ 222/146.5; 222/325; 137/522; 251/82; 425/87; 425/458
[58] Field of Search .................. 137/522, 251; 251/82, 251/347, 348; 219/230, 421; 248/221.4; 221/232; 222/146 H, 146 HE, 325, 509; 425/87, 458

[56] References Cited

U.S. PATENT DOCUMENTS

| | | | |
|---|---|---|---|
| 448,065 | 3/1891 | McShane | 137/522 X |
| 2,600,660 | 6/1952 | Kochner | 137/522 X |
| 3,204,828 | 9/1965 | Paulsen . | |
| 3,298,572 | 1/1967 | Newton . | |
| 3,337,093 | 8/1967 | Newton | 222/146 HE |
| 3,430,816 | 3/1969 | Nadherny et al. | 222/146 HE |
| 3,612,357 | 10/1971 | Ruskin | 222/146 HE |
| 3,740,295 | 6/1973 | Brown | 219/230 X |
| 3,951,308 | 4/1976 | Thirtle | 222/146 HE X |
| 3,954,206 | 5/1976 | Salonen | 222/146 HE |
| 3,960,296 | 6/1976 | Nord | 222/146 HE |

FOREIGN PATENT DOCUMENTS

| | | |
|---|---|---|
| 0055350 | 10/1981 | European Pat. Off. . |
| 2854230 | 3/1980 | Fed. Rep. of Germany . |
| 2949743 | 6/1981 | Fed. Rep. of Germany . |
| 7728025 | 9/1977 | France . |
| 1131691 | 10/1968 | United Kingdom . |
| 1481745 | 8/1977 | United Kingdom . |

Primary Examiner—Joseph J. Rolla
Attorney, Agent, or Firm—Donald M. Sell; James A. Smith; William L. Huebsch

[57] ABSTRACT

A device for dispensing molten thermoplastic material which an operator grips while using his thumb to press a solid block of the thermoplastic material through a sleeve and into a heated melting chamber from which the molten thermoplastic material is discharged through a nozzle. The device includes a bracket adapted to hold a second block of thermoplastic material in end-to-end relationship with a first block in the sleeve, and a heated barrier ring at the inlet to the melting chamber that restricts escape of the molten thermoplastic material through the sleeve; and may also include a slidable pressure plate between the block and an operator's thumb and/or a trigger-operated outlet valve between the melting chamber and nozzle.

13 Claims, 8 Drawing Figures

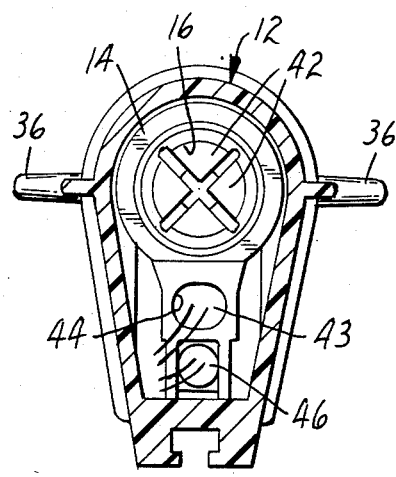
FIG. 4
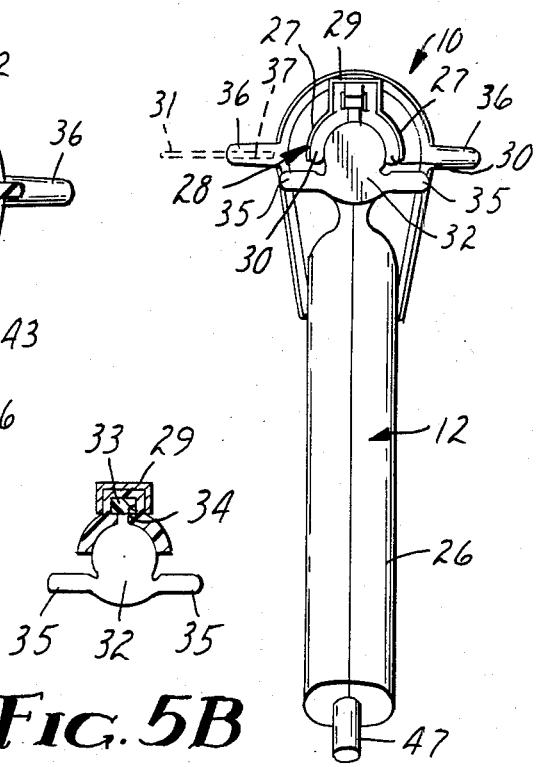
FIG. 5B
FIG. 5A
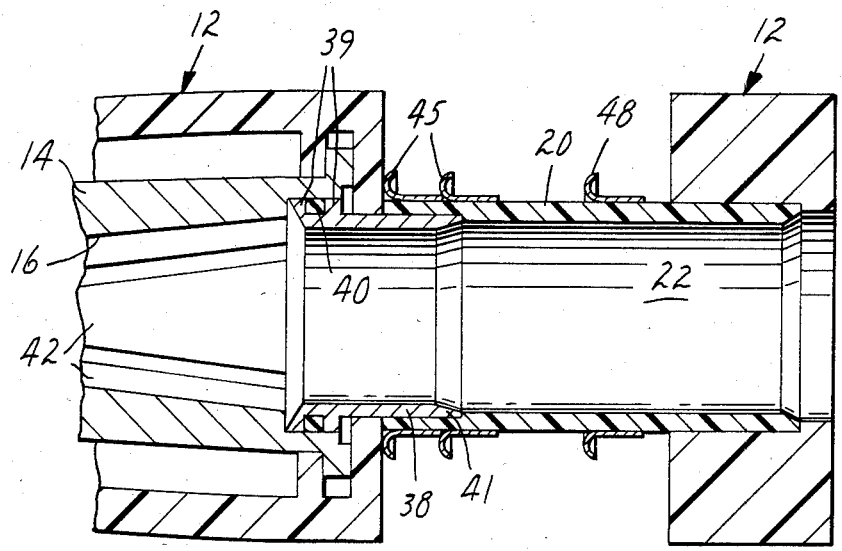
FIG. 3

4,552,287

THERMOPLASTIC DISPENSING DEVICE

TECHNICAL FIELD

This invention relates to devices for dispensing molten thermoplastic materials.

BACKGROUND ART

Many devices are known for dispensing molten thermoplastic materials, such as the devices described in U.S. Pat. Nos. 3,204,828 and 3,298,572.

Generally, such devices comprise a barrel member having an internal melting chamber which communicates with an outlet opening through a nozzle, and a sleeve with a through opening having one end secured to the barrel member with its through opening communicating with the end of the melting chamber opposite the nozzle. The sleeve is adapted to receive an elongate cylindrical block of solid thermoplastic material which fits closely but with a clearance fit within the through opening in the sleeve, with one end portion of the block in the melting chamber and the other end portion projecting through the sleeve. Means are provided for heating the barrel member to melt the end portion of the block therein, and the device includes a handle positioned so that an operator can grip the handle with the fingers of one hand while pressing the block through the sleeve and into the melting chamber with the thumb of that hand to force molten thermoplastic material out of the melting chamber through the nozzle.

While such devices function effectively, certain problems can arise for the operator of such a device when the outer end of a block of thermoplastic material being pressed into the sleeve of the device is closely adjacent or moves past the outer end of the sleeve. The operator's thumb may be burned by molten thermoplastic material that can extrude back toward the outer end of the sleeve through the clearance space between the block and the inner surface of the sleeve. This can be a particular problem if a block of thermoplastic material having a diameter at the small end of the typical tolerance range for such blocks (e.g., 1.511±0.038 centimeters) is used because of the large clearance space (e.g., over 0.076 centimeters) that will exist between the block and the sleeve (which clearance space is necessary so that the sleeve can also freely receive a block at the large end of the tolerance range).

Another problem can occur after the operator places a second block of thermoplastic material end to end with the block in the sleeve and presses on the outer end of the second block. The operator must hold the second block in place, thus occupying the operator's second hand which may be needed elsewhere such as to manipulate articles to which the molten thermoplastic material is being applied. If the operator does not hold the second block in place and releases the pressure on the second block as must be done to stop the flow of the molten thermoplastic material, or applies pressure in some direction other than axially along the second block before its leading end enters the sleeve, the second block can fall or fly away from the block already in the sleeve, which is inconvenient, distracting, and wasteful of the operator's time.

DISCLOSURE OF THE INVENTION

The present invention provides (1) means for holding and properly positioning a second block of solid thermoplastic material at the end of a block of that material already in a sleeve and a melting barrel of a device of the type described above, evenbefore the second block enters the outer end of the sleeve, thereby freeing the use of the operators second hand for other activities; and (2) means for restricting extrusion of molten thermoplastic material back toward the outer end of the sleeve between the block of thermoplastic material and the sleeve even when that block has a diameter at the small end of the tolerance range for such blocks.

The device according to the present invention, in addition to the melting barrel, the sleeve, heating means, and a handle generally of the type described above with respect to the prior art, further includes a bracket assembly at the outer end of the sleeve opposite the melting chamber that provides the means for holding and properly positioning a second block of thermoplastic material. The assembly bracket is adapted to hold the second block of solid thermoplastic material in aligned end-to-end relationship with the block of thermoplastic material in the sleeve while affording engagement by the thumb of an operator to press the second block through the sleeve into the melting chamber. Preferably the bracket assembly comprises spaced opposing gripping parts projecting toward the handle and having opposed concave surfaces adapted to engage the cylindrical block of thermoplastic material along its opposite side surfaces to hold the block in alignment with a block in the sleeve. Also, preferably the gripping parts have spaced distal ends that are resiliently separable to afford transverse movement of the block to a position between the gripping parts, and afford axial movement of the block and the thumb of the operator between the gripping parts to move the second block toward the sleeve.

The means for restricting the extrusion of molten thermoplastic material between the blockand the sleeve comprises a metal barrier ring heated by the means for heating, which barrier ring connects the adjacent ends of the barrel member and the sleeve. The barrier ring has a cylindrical inside diameter that is smaller than the inside diameter of the sleeve (which sleeve is adapted to always receive a block having a diameter at the upper end of its tolerance range with a small clearance fit) and is sized so that the barrier ring will receive a block having a diameter at the upper end of its tolerance range with a slight interference fit (e.g. 0.025 cm) and will receive blocks having a diameter at the lower end of its tolerance range with a small clearance fit (e.g., less than about 0.050 cm). Surprisingly, blocks that engage the barrier ring with such an interference fit will be melted sufficiently around their periphery by the heated barrier ring so that they can be easily pressed into the melting chamber, and blocks that engage the barrier ring with such an interference or clearance fit fit sufficiently close in the barrier ring that no significant amount of molten polymeric material will extrude out of the melting chamber between the block and the barrier ring, and thus no significant amount of such molten thermoplastic material will extrude back toward the outer end of the sleeve between the block and the sleeve.

To insure that manual pressure is applied in the proper direction to the block or blocks of thermoplastic material in the device and to provide projection for the user against physical contact with the blocks and with any molten thermoplastic material that, under unusual circumstances, could escape through the outer end of the sleeve, the device can optionally include a pressure plate adapted to abut the end of the block of thermoplastic material opposite the sleeve and to be positioned between the block and the user's thumb. The pressure plate is slidably mounted on the frame to afford movement of the plate with the block, and is shaped to pass between the gripping parts of the bracket assembly.

Also the dispensing device according to the present invention optionally can be (1) modified to include a trigger operated poppet valve assembly between the nozzle and the melting chamber that minimizes the amount of force that needs to be applied on the block of thermoplastic material by the user's thumb to expel molten thermoplastic material from the nozzle, while affording a quick positive shut-off of the flow of molten material from the nozzle, and pressure relief for the molten thermoplastic material in the melting chamber should that be needed, and/or can be (2) modified by removing the pressure plate to accept a novel newly shaped extra long cylindrical block of solid thermoplastic material that has notches spaced along one side providing spaced surfaces by which the block may be manually pressed into the device.

BRIEF DESCRIPTION OF THE DRAWING

The present invention will be further described with reference to the accompanying drawing wherein like numbers refer to like parts in the several views, and wherein:

FIG. 3 is an enlarged fragmentary sectional view of a barrel member, a sleeve, and a barrier ring therebetween in the dispensing device of FIG. 1;

FIG. 4 is an enlarged sectional view taken approximately along lines 4—4 FIG. 2;

FIG. 5A is a rear end view of the dispensing device of FIG. 1;

FIG. 5B is a sectional view taken approximately along line 5B—5B of FIG. 2;

BRIEF DESCRIPTION OF THE DRAWING

Figure 1:
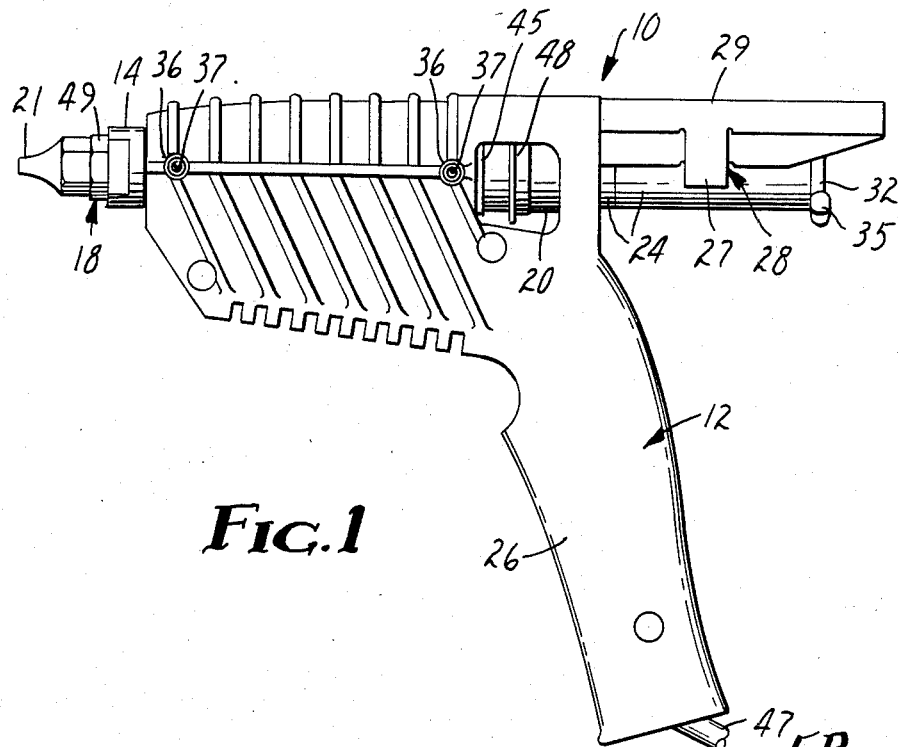
FIG. 1 is a side view of a first embodiment of a dispensing device according to the present invention.
Figure 2:
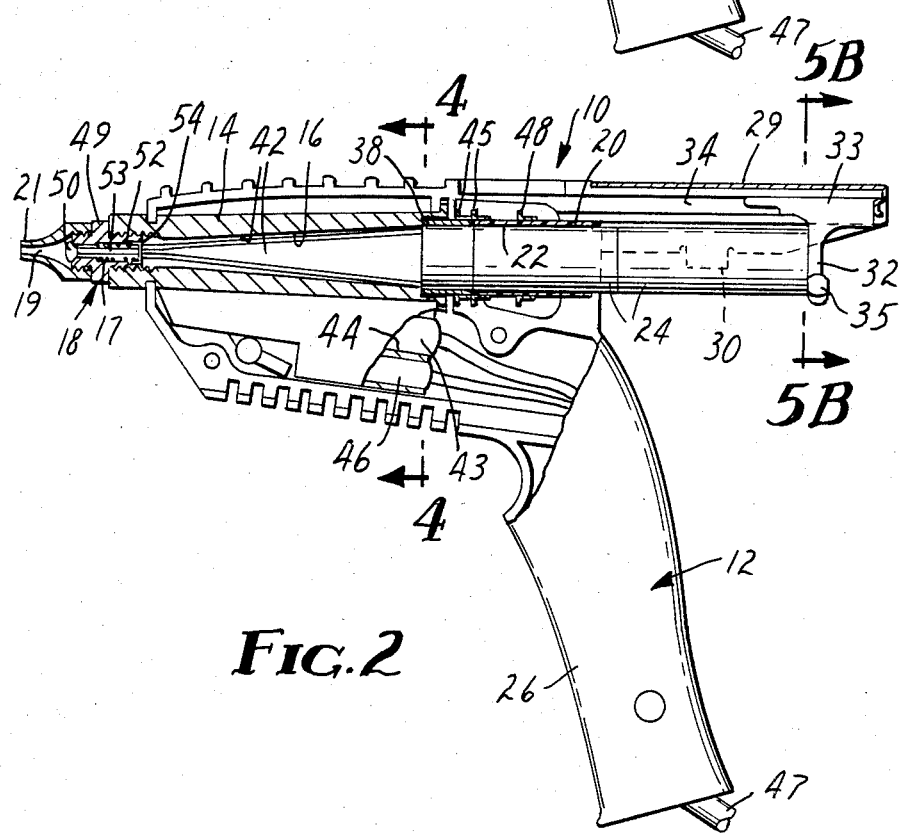
FIG. 2 is a side view of the dispensing device of FIG. 1 with parts broken away and sectioned to show details.

Referring now to the drawing there is shown in FIGS. 1 through 5 a first embodiment of a dispensing device for molten thermoplastic material according to the present invention, generally designated by the reference numeral 10.

Like known prior art dispensing devices for thermoplastic material, the dispensing device 10 comprises a two part frame 12, a barrel member 14 mounted between the part of the frame 12 and having an internal melting chamber 16 communicating via a discharge passageway 17 through a valve assembly 18 with an outlet opening 19 through a nozzle 21, and a sleeve 20 with a cylindrical through opening 22 having one end secured to the barrel member 14 with its through opening 22 communicating with the end of the melting chamber 16 opposite the discharge passageway 17. The sleeve 20 is adapted to receive a cylindrical block 24 of solid thermoplastic material within the cylindrical through opening 22 with a slight clearance fit even when the diameter of the block 24 is at the large end of its tolerance range, with one end portion of the block 24 in the melting chamber 16 and the block 24 projecting through the opening 22 in the sleeve 20. Means are provided in the device 10 for heating the barrel member 14 to melt the end portion of the block 24 therein. The frame 12 includes a handle 26 positioned so that an operator can grip the handle 26 with the fingers of one hand while applying pressure with the thumb of that hand to press the block 24 through the sleeve 20 and into the melting chamber 16 and force molten thermoplastic material out of the melting chamber 16 through the valve assembly 18 and nozzle 21.

Unlike known prior art devices, the device 10 further includes a bracket assembly 28 at the end of the sleeve 20 opposite the barrel member 14, which bracket assembly 28 includes means adapted for receiving and for holding a second block 24 of solid thermoplastic material in aligned end-to-end relationship with the block 24 of thermoplastic material in the sleeve 20 while affording the application of force by the thumb of an operator on the end of the block 24 opposite the sleeve 20 to press the second block 24 through the sleeve 20 and into the melting chamber 16.

As illustrated, the bracket assembly 28 comprises spaced opposed gripping parts 30 of the frame 12 (FIG. 5) that project toward the handle 26 in a position spaced from the outer end of the sleeve 20 and on opposite sides of an extension of the axis for the sleeve 20. The gripping parts 30 are biased toward each other by spring means comprising a channel-like member 29 of spring steel engaged around the top surfaces of the two parts of the frame 12 to help hold the two parts of the frame 12 together, and having opposed arcuate projecting portions 27 that are biased against the outer surfaces on the gripping parts 30 of the frame 12. The gripping parts 30 have distal ends spaced at a distance that is less than the diameter of the cylindrical block 24 of thermoplastic material, but which distance is sufficient so that the block 24 can be transversely pressed therebetween to resiliently move the gripping parts 30 away from each other in opposition to the biasing of the projecting portions 27 and afford movement of the block 24 therebetween. Also, the gripping parts 30 have concave opposed inner surfaces adapted to conform to and engage the cylindrical side surfaces of a block 24 of thermoplastic material therebetween to held the block 24 in alignment with a block 24 in the sleeve 20, while affording axial sliding movement of the block 24 and movement of the thumb of the operator between the gripping parts 30 to move the second block 24 into the sleeve 20.

The device also comprises a pressure plate 32 adapted to abut the end of the outermost block 24 of thermoplastic material opposite the meltng chamber 16 and to be positioned between the block 24 and the user's thumb to transfer force therebetween. The plate 32 includes an elongate slide portion 33 (FIG. 2) at one edge slideably mounted in a track 34 defined between the parts of the frame 12 to afford movement of the plate 32 with the block 24 and is shaped to pass between the gripping parts 30 (FIG. 5) so that the plate 32 can be used to push the block 24 fully into the sleeve 20 while directing forces applied to the plate 32 in the longitudinal direction of the block 24, and protects an operator's thumb from contact with the thermoplastic block 24 and from contact with any molten thermoplastic material that (under unusual conditions) might extrude to the outer end of the sleeve 20. The pressure plate 32 includes two wing portions 35, one projecting from each side, which wing portions 35 are positioned to pass under the gripping parts 30 as the pressure plate 32 is used to press the block 24 into the sleeve 20, and either of which wing portions 35 can be manually engaged to move the pressure plate 32 away from the sleeve 20 to facilitate placing a new block 24 of thermoplastic material between the gripping parts 30 after a previous block 24 has been pushed into the sleeve 20.

The two parts of the frame 12 are molded of a suitable high-temperature resistant polymeric material (e.g., the material commercially designated Dupon, Zytel FR50-NC10 available from E. I. DuPont deNemours, Wilmington, Del.). Both parts of the frame 12 are formed with spaced posts 36 projecting generally radially outwardly of the barrel member 14, which posts 36 can provide means for spacing the major side surface of the frame 12 and the nozzle 21 of the device 10 from a horizontal surface on which the device 10 is laid, and which posts 36 have sockets 37 adapted to receive end portions of a generally U-shaped wire 31 (FIG. 5) to further space the device 10 away from such a surface should that be desired.

The sleeve 20 is made of a stiff heat-resistive polymeric material (e.g., Teflon ®) made by an extrusion process to provide a polished inner surface with microscopic longitudinally extending scratches that facilitates movement of the thermoplastic material through the sleeve 20, particularly after molten thermoplastic has cooled in the sleeve 20 and is again heated by the device 10.

The sleeve 20 is coupled to the barrel member 14 by a metal barrier ring 38 (FIGS. 2 and 3) that is heated by the means for heating the barrel member 14, which barrier ring 38 provides means for restricting the extrusion of molten thermoplastic material between the block 24 and the inner surface of the sleeve 20. The inlet barrier ring 38 is a generally cylindrical member having axially spaced radically outwardly projecting ribs 39 at one end positioned in a cylindrical socket in the end of the barrel member 14, between which ribs 39 is a sealing strip 40 pressed between the barrier ring 38 and barrel member 14 to provide a seal therebetween. An end portion 41 of the barrier ring 38 opposite the barrel member 14 is press fit into an internally relieved area of the sleeve 20. The barrier ring 38 has a cylindrical inside surface that is smaller in diameter than the inside diameter of the sleeve 20 (which sleeve 20 is adapted to always receive a block 24 with a slight clearance fit even when the diameter of the block 24 is at the upper end of its tolerance limits) so that the barrier ring 38 will receive a block 24 having a diameter at the upper end of its tolerance limits with a slight interference fit (e.g., an interference of up to 0.025 cm) or will receive a block 24 having a diameter at the lower end of its tolerance range with a clearance fit of about 0.050 cm. Surprisingly those blocks 24 with a diameter that provides such a slight interference fit with the barrier ring 38 will be melted sufficiently around their periphery by the heated barrier ring 38 that they can be easily pressed into the melting chamber 16, and blocks 24 of thermoplastic material with diameters that provide either such slight interference fits or clearance fits fit sufficiently close in the barrier ring 38 so that no significant amount of molten polymeric material will extrude out of the melting chamber 16 between the block 24 and the barrier ring 38 and toward the outer end of the sleeve 20 between the block 24 and the sleeve 20.

The device 10 also includes three metal (preferably brass) cooling flanges around the outer periphery of the sleeve 20 that provide means for developing predetermined temperature zones in the sleeve 20, including two closely spaced regulating flanges 45 at the end of the sleeve 20 adjacent the barrier ring 38 which cool and regulate the temperature of the molten thermoplastic material in the area between the barrier ring 38 and the sleeve 20, and a cooling flange 48 about centered along the length of the sleeve 20 that cools the sleeve to restrict the thermoplastic material from becoming molten past that area along the sleeve 20, even if the heating means is activated for a long period of time during which molten thermoplastic material is not being dispensed from the device 10.

The barrel member 14 is of a suitable metal (e.g., aluminum). The melting chamber 16 in the barrel 14 is defined by a generally frustroconical inner surface tapered toward the valve assembly 18 to direct the molten polymeric material to the dicharge passageway 17 through the valve assembly 18, and four equally spaced radially inwardly projecting ribs 42 which provide heated contact surfaces in addition to the frustroconical inner surface for engaging and melting the blocks 24 of thermoplastic material as they are pressed into the chamber 16. An electric heating element 43 which heats both the barrel member 14 and the barrier ring 38 is positioned in a socket 44 in the barrel member 14 beneath the chamber 16, and a thermostat 46 is fixed in a channel below the heating element 43 to disconnect electrical power normally supplied heating element 43 via a power cord 47 and the thermostat 46 when the temperature of the barrel member 14 at the thermostat 46 exceeds a predetermined maximum (e.g., 200° C.).

The valve assembly 18 between the barrel member 14 and the nozzle 21 provides valve means for restricting molten thermoplastic material from running out of the nozzle 21 until a predetermined amount of force (e.g., about 0.9 to 1.8 kilograms) is manually applied to the block 24 of thermostatic material to cause pressure in the molten thermoplastic material in the melting chamber 16. The valve assembly 18 is of the poppet valve type and includes a valve body 49 secured between the barrel member 14 and nozzle 21, which valve body 49 defines the discharge passageway 17 communicating between the melting chamber 16 and the opening 19 through the nozzle 21. The discharge passageway 17 through the valve body 49 is normally closed by a head 50 on a valve normally biased against a valve seat on the end of the valve body 49 adjacent the nozzle 21 by a spring 52 compressed between a flange on the valve body 49 and a perforated retaining disk 54 fixed on a stem 53 of the valve, which disk 54 is axially slidably mounted in the valve body 49. Pressure from molten thermoplastic material in the melting chamber 16 and discharge passageway 17 caused by pressure manually applied to the block 24 of thermoplastic material can move the valve head 50 away from its seat against the bias of the spring 52 and allow molten thermoplastic material to pass the valve head 50 and be discharged through the nozzle 21. When the operator 5 releases such pressure, however, the valve head 50 will again move to its seat under the influence of the spring 52 to prevent any more molten thermoplastic material within the melting chamber 16 and discharge passegeway 17 from escaping through the nozzle 21.

To use the dispensing device 10, an operator first connects the power cord 47 to a source of electrical power so that the barrel member 14 and barrier ring 38 are heated by the heating element 43. The operator then places the block 24 of thermoplastic material in the opening 22 through the sleeve 20, grabs the handle 26 with one hand, and uses the thumb of that hand to press against the pressure plate 32 to slide it along the track 34 into engagement with the block 24 and thereby press the block 24 through the sleeve 20 and barrier ring 38 and into the melting chamber 16 in the barrel member 14 where the end portion of the block 24 will be made molten by contact with the inner surface of the barrel member 14, including the inwardly projecting ribs 42. While the inner surface of the sleeve 20 will provide a clearance fit with the periphery of the block 24, even if the diameter of the block 24 is at the upper limit of its tolerance range, the barrier ring 38 has a cylindrical inner surface with a slightly smaller inner diameter than the inner diameter of the sleeve 20 and will provide a slight interference fit or a very close clearance fit with the block 24, depending on whether the diameter of the block 24 is at the upper or lower limit of its tolerance range. If there is an interference fit, the barrier ring 38 will melt the periphery of the thermoplastic block 24 sufficiently to allow it to easily pass; and in either event the barrier ring 38 will greatly restrict extrusion of thermoplastic material from the melting chamber 16 back between the block 24 and the barrier ring 38 and thus between the block 24 and the inner surface of the sleeve 20. Sufficient pressure in the molten thermoplastic within the melting chamber 16 caused by manual pressure on the pressure plate 32 and block 24 will cause the head 50 of the valve to move away from its valve seat against the bias of the spring 52 so that the molten thermoplastic can flow around the head 50 and out the outlet opening 19 of the nozzle 21. When manual pressure is released on the pressure plate 32, the head 50 will again move to its seat under the inluence of the spring 52 which stops the flow of molten material through the nozzle 21 and restricts air from reaching the molten thermoplastic material in the melting chamber 16, thereby restricting oxidation of the molten thermoplastic in the valve assembly 18. If the heating element 43 remains activated for a long time while no molten thermoplastic material is dispensed through the nozzle 21, heat buildup can cause the block 24 to melt (at least around its periphery), to about the midpoint of the sleeve 20 where such melting will be restricted by the cooling effect of the cooling flange 48. If the power is then disconnected so that this molten thermoplastic material cools and solidifies, and the power is then again connected to heat the heating element 43, the thermoplastic material in the valve assembly 18 will be some of the first thermoplastic material melted and the valve assembly 18 can act as a relief valve for pressure developed in the barrel member 14 as the rest of the thermoplastic material in the barrel member 14 melts. Also, the smooth longitudinally micro-grooved inner surface of the sleeve 20 will facilitate breaking loose of the block 24 from the sleeve 20 to press it through the barrier ring 38 and into tne melting chamber 16 to again cause the molten thermoplastic material to flow out of the nozzle 21.

When the outer end of the block 24 of thermoplastic material reaches the outer end of the sleeve 20, the operator can manually retract the pressure plate 32 along its track 34 via one of the wing portions 35 and press a new block 24 of thermoplastic material transversely between the gripping parts 30 of the holding bracket 28, whereupon the new block 24 will be held in proper alignment with the sleeve 20, and the operator can again use the pressure plate 32 to press the new block 24 into the melting chamber 16.

Figure 6:
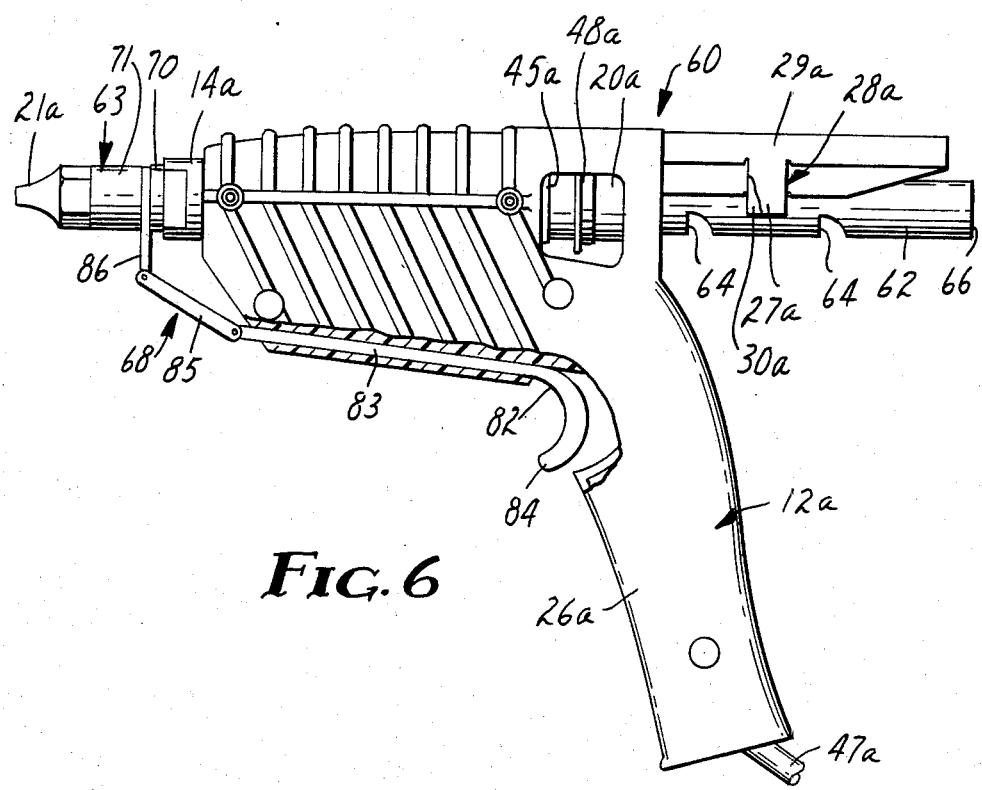
FIG. 6 is a side view of a second alternate embodiment of a dispensing device according to the present invention having parts broken away and sectional to show details.

Referring now to FIG. 6 of the drawing, there is shown a second embodiment 60 of a dispensing device for molten thermoplastic material according to the present invention which can be made by modifying the dispensing device 10 shown in FIGS. 1 through 5, and which has parts identical to parts of the device 10 identified with the same reference numerals used for the parts of the device 10 except for the addition of the suffix "a".

Like the dispensing device 10, the dispensing device 60 comprises a two-part frame 12a, a barrel member 14a mounted on the frame 12a having an internal melting chamber 16a communicating via a discharge passageway 61 through a poppet valve assembly 63 from the chamber with an outlet opening 19a through a nozzle 21a, and a sleeve 20a mounted on the frame 12a with a through opening having one end secured at the barrel member 14a with its through opening communicating with the end of the melting chamber 16a opposite the discharge passageway 61. The sleeve 20a is adapted to receive a generally cylindrical block 62 of solid thermoplastic material with a clearance fit within the through opening in the sleeve 20a even when the diameter of the block 62 is at the large end of its tolerance range with one end of the block 62 in the melting chamber 16a and the block 62 projecting through the cylindrical opening in the sleeve 20a. Means in the form of a heating element controlled by a thermostat (identical to the heating element 43 and thermostat 46) are mounted on the barrel member 14a for heating the barrel member 14a to melt the end portion of the block 62 in the melting chamber 16a, and the frame 12a includes a handle 26a positioned so that an operator can grasp the handle 26a with the fingers of one hand while applying pressure with the thumb of that hand to press the block 62 through the sleeve 20a into the melting chamber 16a and force molten thermoplastic material through the valve assembly 63 and out of the nozzle 21a.

Also, like the device 10, the device 60 includes a bracket assembly 28a at the end of the sleeve 20a opposite the barrel member 14a, which bracket assembly 28a includes means adapted for receiving a second block 62 of solid thermoplastic material pressed transversely thereon, and for holding the second block 62 in aligned end-to-end relationship with the block 62 of thermoplastic material in the sleeve 20a while affording the application of force by the thumb of an operator on its end opposite the sleeve 20a to press the second block 62 through the sleeve 20a and into the melting chamber 16a. The bracket assembly 28a comprises spaced opposed gripping parts 30a of the frame 12a that project toward the handle 26a and are biased toward each other by spring means comprising a steel channel-like member 29a having opposed arcuate projecting portions 27a that are biased against the outer surfaces of the gripping parts 30a.

Unlike the dispensing device 10 the dispensing device 60 has the pressure plate removed nd requires the operator to press directly on the block 62 of solid thermoplastic material. Also, though the conventional cylindrical blocks 24 of thermoplastic material illustrated in the device 10 could be used in the device 60, the generally cylindrical block 62 of thermoplastic material illustrated in the device 60 is different than the blocks 24 in that it has the length of several of the blocks 24. Also, the block 62 has notches 64 along one side at spaced locations to provide spaced engagement surfaces disposed at about right angles with respect to the axis of the block 62 with which surfaces the thumb of a user may be engaged to press the block 62 into the sleeve 20a. The notches 64 are spaced (e.g., at about 5 cm) so that onepressure surface in a notch 64 or an end surface 66 on the block 62 is always conveniently positioned to be engaged by the user's thumb. The initial length of the block 62 provides the advantage of reducing the number of blocks 62 of thermoplastic material that must be loaded into the device 60 for a given output of melted thermoplastic material, which can be advantageous, particularly where a large amount of the molten thermoplastic material is to be dispensed in a short time.

Also, unlike the device 10, the device 60 is fitted with a manually operable trigger assembly 68 for controlling the poppet valve assembly 63 between the barrel member 14a and the nozzle 21a so that the valve assembly 63 may be manually actuated to allow molten thermoplastic material to escape through the nozzle 21a.

Figure 7:
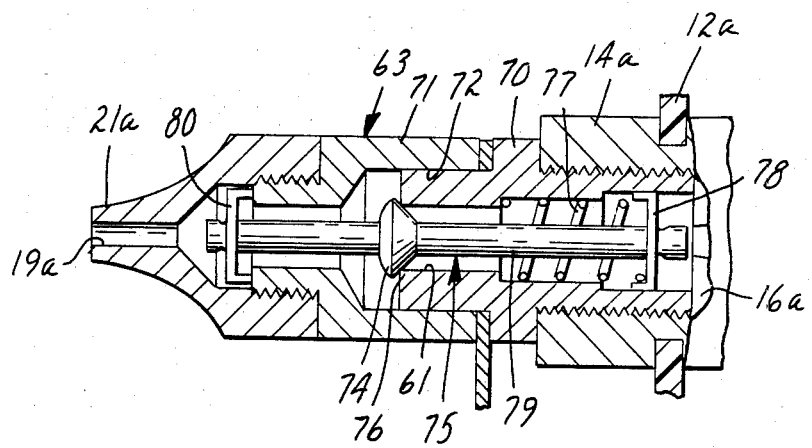
FIG. 7 is an enlarged sectional view of a valve assembly in the dispensing device of FIG. 6.

The poppet valve assembly 63 (FIG. 7) comprises a first body member 70 threadably secured to the outlet end of the barrel member 14a; and a second body member 71 on which the nozzle 21a is threadably engaged, which second body member 71 has a cylindrical inner surface 72 axially slidably mounted on a cylindrical outer surface at the end of the first body member 70 opposite the barrel member 14a. The first and second body members 70 and 71 define the discharge passageway 61 communicating between the melting chamber 16a and the opening 19a through the nozzle 21a, which passageway 61 is normally closed by a head 74 on a valve 75 normally biased against a valve seat 76 on the end of the first body member 70 by a spring 77 compressed between a flange on the first body member 70 and a perforated retaining disk 78 fixed on a stem 79 of the valve 75, which disk 78 is axially slidably mounted in the first body member 70. The stem 79 also extends from the side of the head 74 opposite the first body member 70 and is fixed to a perforated flange 80 engaged with an end of the second body member 71 opposite the first body member 70 so that the biasing of the spring 77, in addition to biasing the head 74 against its seat 76, will also bias the body members 70, 71 toward a position telescoped together.

The trigger assembly 68 comprises a trigger 82 having a straight elongate portion 83 slidably mounted in a channel defined between the parts of the frame 12a and an arcuate end position 84 along the handle 26a in a position adapted for engagement by a user's index finger. A link 85 is pivotably attached to the trigger 82 at its end opposite its arcuate end portion 84, and a lever 86 pivotably mounted at one end to the end of the link 85 opposite the trigger 82 and positioned between adjacent surfaces of the and second body members 70 and 71. When the arcuate end portion 84 of the trigger 82 is pulled toward the handle 26a by a user, the lever 86, via the link 85, will be pivoted between the body members 70, 71, causing them to separate and the head 74 of the valve 75 to be lifted from its seat 76 against the biasing of the spring 77 so that manual pressure against the block 62 of thermoplastic material will cause molten thermoplastic material to flow past the head 74 and out of the nozzle 21a.

The trigger operated valve assembly 63 affords dispensing molten thermoplastic material from the device 60 with less manual force against the block 62 of thermoplastic material than is required against the block 24 in the device 10, since the valve assembly 63 can be opened via the trigger assembly 68 rather than by pressure in the melting chamber 16a as is required to open the valve assembly 18 in the dispensing device 10. The valve assembly 63 still provides a positive shut-off to prevent molten thermoplastic material from escaping from the nozzle 21a when the trigger assembly 68 is not being manually operated and pressure relief during re-melting of thermoplastic material in the melting chamber 16a that has solidified after prior usage of the device 60. The positive shut-off is in fact improved since the valve can be set to open at a higher pressure (e.g., twice the pressure needed to open the valve assembly 18) since the pressure required to open the valve assembly 63 need not be so low that the valve assembly 63 can be easily opened by force manually applied to the molten thermoplastic material through the block 62 of thermoplastic material.

I claim:

1. In a device for dispensing molten thermoplastic material comprising a frame, a barrel member mounted on said frame and having an internal melting chamber communicating with an outlet opening through a nozzle, a sleeve with a through opening having one end secured at said barrel member and said opening communicating with the end of said melting chamber opposite said outlet opening, said sleeve being adapted to receive a block of solid thermoplastic material with one end portion of the block in the melting chamber and the block projecting through said sleeve, and means for heating said barrel member to melt the end portion of the block therein, said frame including a handle positioned so that an operator can grip the handle with the fingers of one hand while applying pressure with the thumb of that hand directly toward the end of the block opposite the melting chamber to press the block through the sleeve and into the melting chamber to force molten thermoplastic material out said outlet opening, the improvement wherein:

said device further includes holding means at the end of said sleeve opposite said melting chamber adapted for holding a second block of solid thermoplastic material outside said sleeve in aligned end-to-end relationship with a said block of thermoplastic material in said sleeve while affording pressure by the thumb of an operator to press the second block into the sleeve and melting chamber, said holding means comprising spaced opposed resiliently flexible gripping parts projecting towards said handle, said gripping parts having opposed distal surfaces spaced so that the second block can be transversely pressed therebetween to resiliently move the gripping parts away from each other and afford movement of the block therebetween, and having opposed inner surfaces adapted to engage the seocnd block of polymeric material along its opposite side surfaces to hold the second block in alignment with the block in said sleeve, while affording movement of the second block and the thumb of the operator between said gripping parts to move the seoond block toward said sleeve.

2. A device according to claim 1 wherein said device further comprises a pressure plate adapted to abut the end of a said block of thermoplastic material opposite the sleeve and to be positioned between the block and the user's thumb, said plate being slideably mounted on said frame to afford movement of said plate with the block, and being shaped to pass between said gripping parts.

3. A device according to claim 2, wherein said pressure plate has at least one projecting wing portion positioned to pass said gripping parts and adapted to be manually engaged to move the pressure plate away from said sleeve to facilitate placing a new block of thermoplastic material therebetween.

4. A device for dispensing molten thermoplastic material comprising a frame, a barrel member mounted on said frame and having an internal melting chamber communicating through a valve assembly with an outlet opening through a nozzle, a sleeve with a through opening having one end secured to said barrel member and said opening communicating with the end of said melting chamber opposite said outlet opening, said sleeve being adapted to receive a block of solid thermoplastic material with one end portion of the block in the melting chamber and the block projecting through said sleeve, and means for heating said barrel member to melt the end portion of the block therein, said frame including a handle positioned so that an operator can grip the handle with the fingers of one hand while pressing the block through the sleeve and into the melting chamber to force molten thermoplastic material out said outlet opening, said valve assembly including means for opening said valve assembly when the pressure of molten thermoplastic material in said melting chamber exceeds a predetermined amount and means for closing said valve assembly when the pressure of molten thermoplastic material in said melting chamber drops below said predetermined amount and said device including trigger means adapted to be manually activated by an operator to override said means for closing said valve assembly and afford dispensing molten thermoplastic material with a force against said block that is less than the force required to develop said predetermined amount of pressure in said melting chamber.

5. A device according to claim 4 wherein said device further includes means at the end of said sleeve opposite said melting chamber adapted for holding a second block of solid thermoplastic material in aligned end-to-end relationship with a said block of thermoplastic material in said sleeve while affording engagement by the thumb of an operator to press the second block into the sleeve and melting chamber.

6. A device according to claim 5 wherein said means for holding comprises spaced opposite resiliently flexible gripping parts projecting towards said handle having opposed distal surfaces spaced so that the second block can be transversely pressed therebetween to resiliently move the gripping parts away from each other and afford movement of the block therebetween, and having opposed, inner surfaces adapted to engage the second block of thermoplatic material along its opposite side surfaces to hold the second block in alignment with the block in said sleeve, while affording movement of the second block and the thumb of the operator between said gripping parts to move the second block toward said sleeve.

7. A device according to claim 4 wherein said device further comprises a pressure plate adapted to abut the end of a said block of polymeric material opposite the sleeve and to be positioned between the block and the user's thumb, said plate being slideably mounted on said frame to afford movement of said plate with the block.

8. A device according to claim 7, wherein said pressure plate has at least one projecting wing portion adapted to be manually engaged to move the pressure plate away from said sleeve to facilitate placing a new block of thermoplastic material therebetween.

9. A device according to claim 4 wherein said device further includes a barrier ring heated by said means for heating at the end of said melting chamber adjacent said sleeve, said barrier ring having an inside diameter that is smaller than the inside diameter of said sleeve and is adapted to receive a said block of thermoplastic material having a diameter at the upper end of its tolerance limit with an interference fit and thereby provide an effective seal against molten thermoplastic material extruding between the block and the barrier ring and between the block and the sleeve as the block is pressed into the melting chamber.

10. A device according to claim 9 wherein said device further includes means at the end of said sleeve opposite said melting chamber adapted for holding a second block of solid thermoplastic material in aligned end-to-end relationship with a said block of thermoplastic material in said sleeve while affording engagement by the thumb of an operator to press the second block into the sleeve and melting chamber.

11. A device according to claim 10 wherein said means for holding comprises spaced opposed resiliently flexible gripping parts projecting towards said handle having opposed distal surfaces spaced so that the second block can be transversely pressed therebetween to resiliently move the gripping parts away from each other and afford movement of the block therebetween, and having opposed inner surfaces adapted to engage the second block of thermoplastic material along its opposite side surfaces to hold the second block in alignment with the block in said sleeve, while affording movement of the second block and the thumb of the operator between said gripping parts to move the second block toward said sleeve.

12. A device according to claim 10 wherein said device further comprises a pressure plate adapted to abut the end of a said block of thermoplatic material opposite the sleeve and to be positioned between the block and the user's thumb, said plate being slideably mounted on said frame to afford movement of said plate with the block.

13. A device according to claim 12, wherein said pressure plate has at least one projecting wing portion adapted to be manually engaged to move the pressure plate away from said sleeve to facilitate placing a new block of thermoplastic material therebetween.

* * * * *